United States Patent [19]

Stewart

[11] 4,092,537

[45] May 30, 1978

[54] DIAGNOSTIC APPARATUS AND METHOD FOR GAS TURBINE ENGINES

[75] Inventor: Peter Antony Eabry Stewart, Bristol, England

[73] Assignee: Rolls-Royce (1971) Limited, Great Britain

[21] Appl. No.: 655,097

[22] Filed: Feb. 4, 1976

[30] Foreign Application Priority Data

Feb. 12, 1975 United Kingdom ............... 06040/75
Sep. 18, 1975 United Kingdom ............... 38311/75

[51] Int. Cl.² ........................ G03B 35/00; G03C 9/00
[52] U.S. Cl. ..................................... 250/314; 250/402
[58] Field of Search ........ 250/314, 402, 413, 213 VT, 250/416 TV

[56] References Cited

U.S. PATENT DOCUMENTS

| 2,853,619 | 9/1958 | DeWitt | 250/402 |
| 3,440,422 | 4/1969 | Ball et al. | 250/402 |
| 3,769,633 | 10/1973 | Teeter | 250/213 VT |
| 3,890,503 | 6/1975 | Brewster | 250/402 |

Primary Examiner—Alfred E. Smith
Assistant Examiner—B. Anderson
Attorney, Agent, or Firm—Stevens, Davis, Miller & Mosher

[57] ABSTRACT

The passage of foreign objects such as bullets or stones through a gas turbine engine compressor is observed by directing beams of x-radiation through the engine, receiving the beams on fluorescent screens, to form fluorescent images, intensifying the fluorescent images by respective image intensifiers and recording the intensified images with respective high speed cine cameras.

11 Claims, 6 Drawing Figures

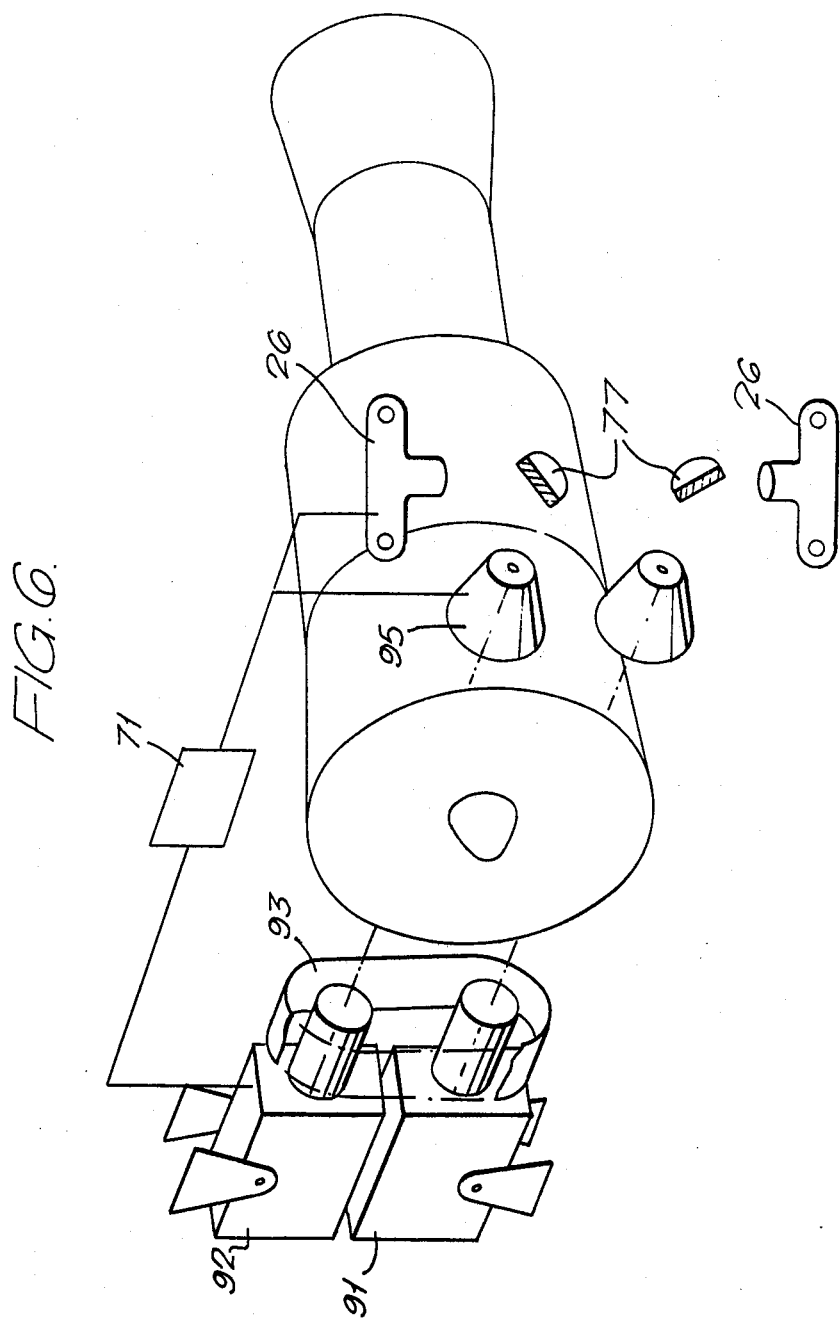

DIAGNOSTIC APPARATUS AND METHOD FOR GAS TURBINE ENGINES

This invention relates to improvements in diagnostic apparatus and method for gas turbine engines, and has particular reference to the determination of the motion of foreign objects or broken engine components within an operating gas turbine engine.

Extensive use is currently made of bypass gas turbine engines which offer particular advantages in fuel economy and low noise levels. Inherent in the design of a bypass engine is the use of a core engine to drive a fan. One part of the fan delivery is used for propulsive purposes and a second part is used to supercharge the core engine.

Unfortunately blade loss from relatively large diameter fans can cause severe imbalance situations and the broken blade portions can also be ingested by the core engine and subsequently cause severe damage to the relatively fragile core engine components.

The problem of damage to core engine and fan components is also attributable to ingestion by the engine of flying objects ranging from birds and stones to bullets and cartridge shells. The design of engines to at least partially avoid the effects of damage by these various foreign objects, has been made more difficult by the inability of designers to observe the motion of foreign objects within an operating gas turbine engine.

Furthermore, it has not so far proved possible to observe the detailed structural deformation of failure mechanism that occurs as foreign objects strike, and perhaps penetrate, engine components such as honeycombe. All that has been possible is to observe the pre and post impact conditions.

According to the present invention there is provided a method of observing the motion of foreign objects through an operating gas turbine engine comprising the following steps:

(a) energising a device or devices for producing beams of electromagnetic radiation in the energy range 150 KV to 12 MeV each beam being of power greater than 50 rads per minute at a meter, and the each device having either a high pulse repetition frequency or a substantially constant output, (b) directing each beam along a chordal line of the gas turbine engine thereby to traverse substantially a whole cross-section of the engine, (c) receiving the exiting beams on respective fluorescent screens to form fluorescent images, (d) intensifying the fluorescent images and (e) recording said intensified fluorescent images by respective high speed camera or other high speed recording means capable of recording at speeds in excess of 2,500 frames/sec or above.

According to one aspect the method comprises the further step of applying a common time signature to each recorded image whereby the sequence of events in the particular cross-section of the engine may be determined.

Also according to the present invention there is provided diagnostic apparatus for observing the motion of foreign objects through an operating gas turbine engine comprising means for producing beams of electromagnetic radiation in the energy range 150KV to 12 MeV and each beam being of power greater than 50 rads per minutes at a meter and emitted at either a high pulse repetion frequency or a substantially constant output, means for directing the beams along chordal lines of the gas turbine engine for traversing substantially a whole cross-section of the engine, fluorescent screens for receiving the exiting beams from the engine for forming fluorescent images, means for intensifying the fluorescent images and respective high speed recording means for recording the intensified images at framing speeds in excess of 2,500 frames per second.

When using higher energies greater than 500KV each fluorescent image may be rotated by an optical arrangement away from the fluorescent screen prior to the intensification thereof and there is provided a shield in order to protect the respective intensifier from the direct effects of radiation transmitted through the fluorescent screen.

In this specification the term "fluorescent" is used in its broadest sense to include any transformation from a higher energy radiation to a lower one and is not intended to be restricted to the narrow meaning that a flourescent image flouresces in the visible light wavelengths.

In one embodiment we have found it useful to use the high speed camera with its internal shutter mechanism rendered inoperative and instead to pulse the intensifier electrically to produce the requisite exposure of each frame of the high speed cinematographic film.

Embodiments of the invention will now be described by way of example only with reference to the accompanying drawings wherein:

FIG. 6 is a schematic view of a modification of FIG. 5.

Figure 1:
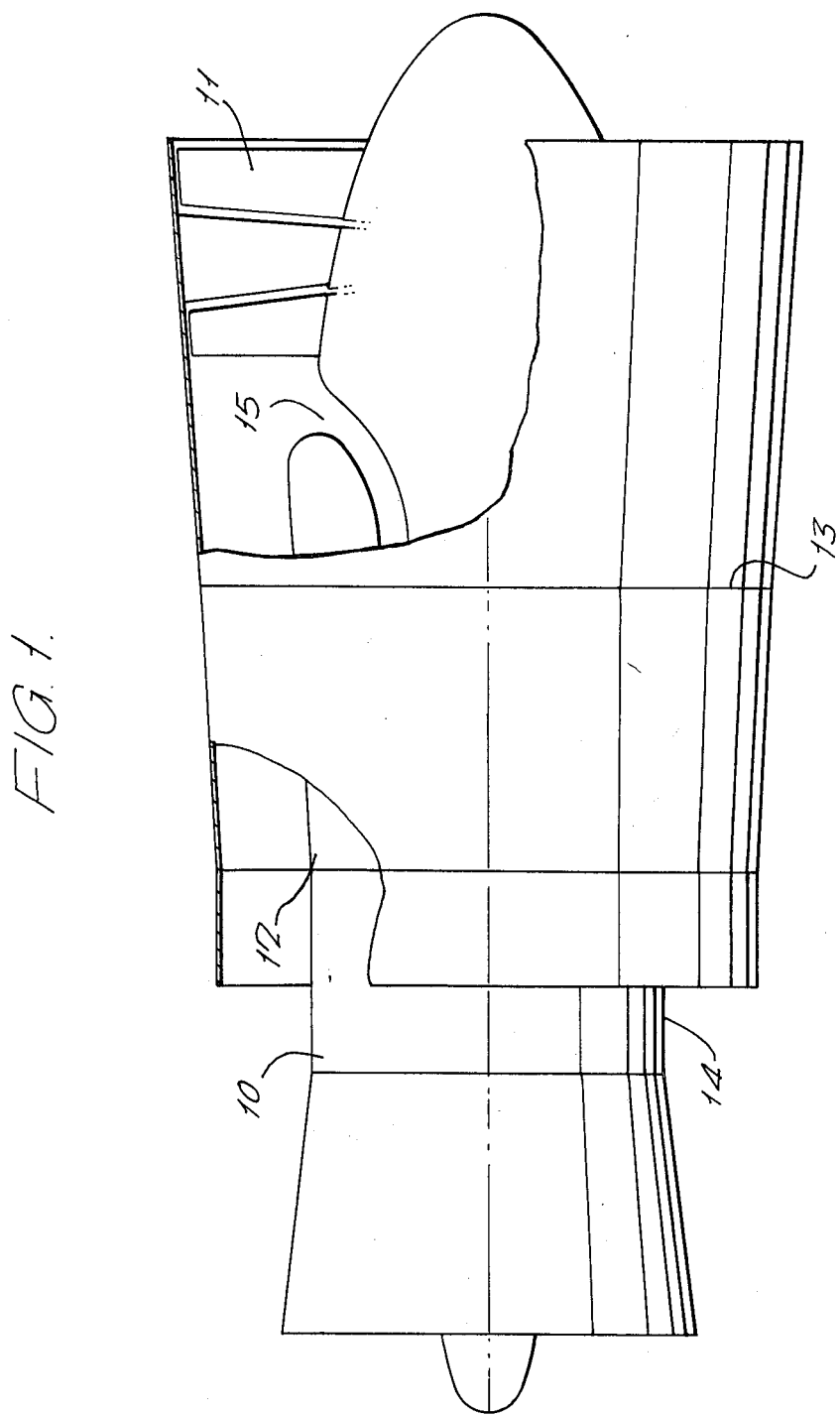
FIG. 1 is a part sectioned view of a front fan gas turbine engine.

Referring now to FIG. 1, a gas turbine engine 10 comprise a front fan 11 driven by a core engine 12. A first part of the delivery from the fan is discharged from the fan casing 13 along the outside 14 of the core engine and the second part is passed via the duct 15 to supercharge the core engine 12.

Figure 2:
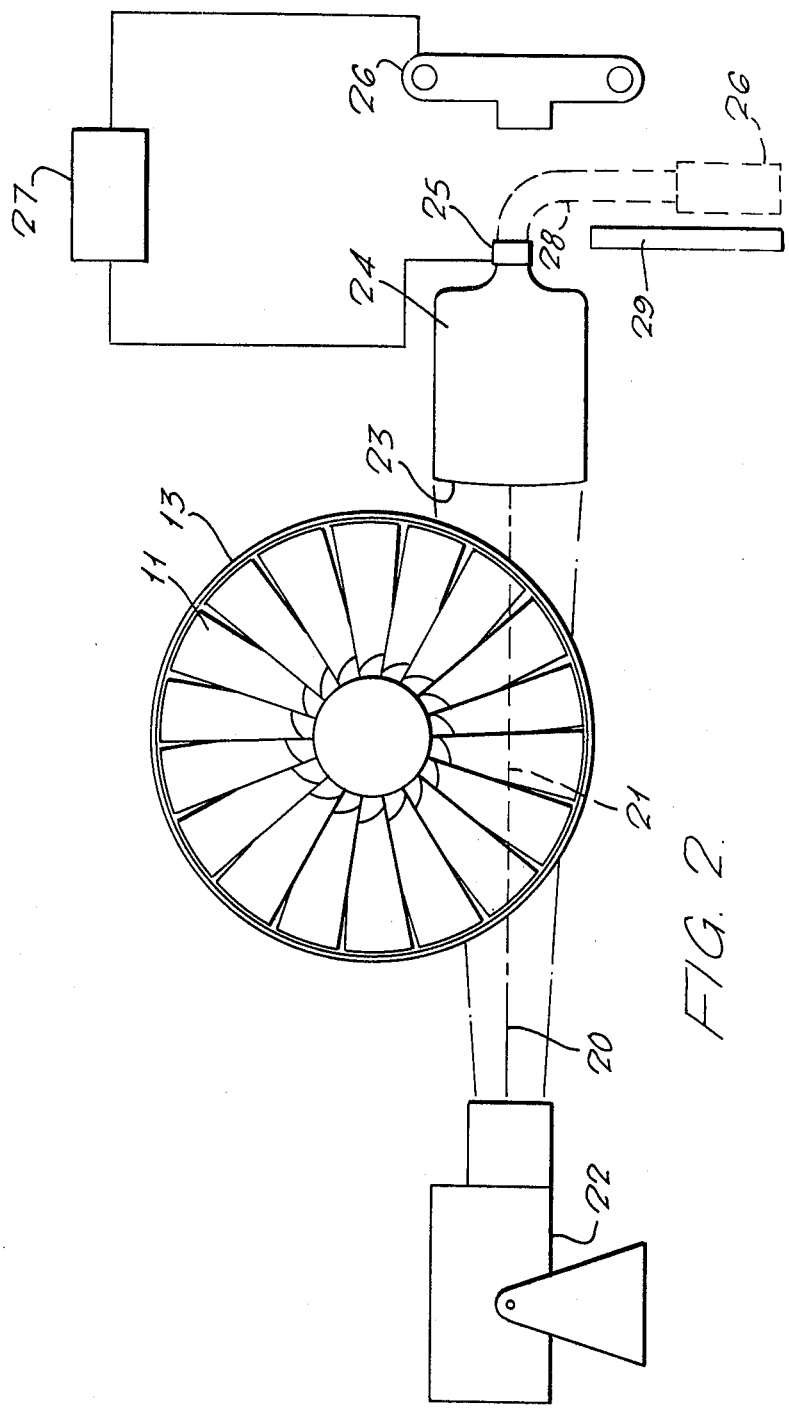
FIG. 2 is a front view of the fan of FIG. 1 showing the alignment of a single X-ray beam.

In FIG. 2 is shown an x-ray beam 20 directed through the fan 11 along a chordal line 21 of the fan casing 13. The x-ray beam is utilised, as will be later explained, to observe the passage of foreign objects through the fan thereby to assist in formulating ideas for modifying the geometry of the engine so as to avoid the ingress of said foreign objects into the passage 15. The x-ray beam is derived from a 350 KV x-ray tube 22 capable of producing a constant output level of 100 rads/min/meter.

In certain applications of the present invention, such as the examination of the ingestion of a metallic foreign object into the low pressure compressor of an engine it will be desirable to utilise higher energy beams up to 12 MeV in order to traverse the relatively large metal thicknesses involved and for this purpose x-ray devices such as 2.3 MeV Van de Graff generators are preferred. Alternatively a linear accelerator may be used as is later described in relation to FIG. 5.

The beam after traversing the fan is received on the input screen 23 of a 12 inches diameter Thomson C.S.F. (Regd. Trade Mark) x-ray image intensifier 24 having a high overall gain and a high luminosity output phosphor to produce a fluorescent image at the output screen 25.

The fluorescent image is recorded for posterity by a high speed cinematographic camera 26, which is focussed directly onto the output screen 25. In our experiments a proprietary camera, namely a Hadland "Hyspeed", running at speeds up to 10,000 frames per second has been found satisfactory. The sequence of photographs on the cinematographic film and the speed of the film enables a time signature to be applied to events taking place within the gas turbine engine. The phoshor in the intensifier needs to have relatively fast rise and decay times, corresponding to the velocity of the object being imaged in order to achieve clear and distinct images. However in certain circumstances the length of the rise and decay times is not as critical as was at first thought. This is because the level of light at the input to the camera is in fact still relatively low and if a film is used having a threshold illuminance below which no image is recorded then only the peak of the rise and decay curve for the luminance of the output phosphor is recorded and this represents a shorter time period than the total width of the rise and decay curve, i.e. as far as the film is concerned, it effectively appears that the rise and decay times for the phosphor are shorter than they actually are. Currently we have found Cesium Iodide to be useful as a fluorescent phosphor. Because of the short time period available to form each image a high overall gain and luminosity of the system is essential, together with as high a power x-ray source as is practical — whilst yet maintaining resolution of the image. (It is possible to get an increase in output power from an increase in source size but the extended source degrades the image quality).

The type of camera we used incorporates a rotating prism shutter and it is necessary to restrict the time period for which light is entering the camera to avoid optical aberration by the rotating shutter. This time period is of the order of 20 microseconds and is controlled from an electronic gating oscillator 27 which produces output pulses of 20 microsecond width at a pulse repetition frequency equal to the desired framing speed of the camera.

The pulses are synchronised with the camera and simultaneously switch the intensifier on and off so that only the fluorescence occurring within the 20 microsecond period is recorded by the camera. We have found an increment in intensity may be achieved by omitting the shutter mechanism used in the high speed camera and instead electronically switching the intensifier on and off to produce the necessary shutter action.

If the light levels achievable on the output from the intensifier turn out to be relatively low such as may occur if only relatively low powered x-ray sources are available, or alternatively if a very radiographically dense engine is being investigated, then it is necessary to optimise the efficiency of the optical system for transmitting the image on the screen 25 to the camera 26 to avoid "losing" available information. One way this may be achieved is with fibre optic bundles.

Should the camera or associated electrical equipment be sucseptible to being upset by the x-radiation then it may be convenient to deflect the image through 90° either by way of a fibre optic bundle, (as shown in dotted lines 28), or by a mirror, to a position in which it can be adequately shielded by lead shielding 29 from incident x-radiation.

It will be appreciated that the use of a single x-ray beam and one fluorescent screen only enables a small portion of the fan casing to be observed. Because with running gas turbine engines foreign objects are capable of ricocheting inside the engine it is proposed as shown in FIGS. 3 and 4 to provide a plurality of x-ray beams and fluorescent screens disposed so as to enable the entire volume of the fan casing to be observed.

Figure 3:
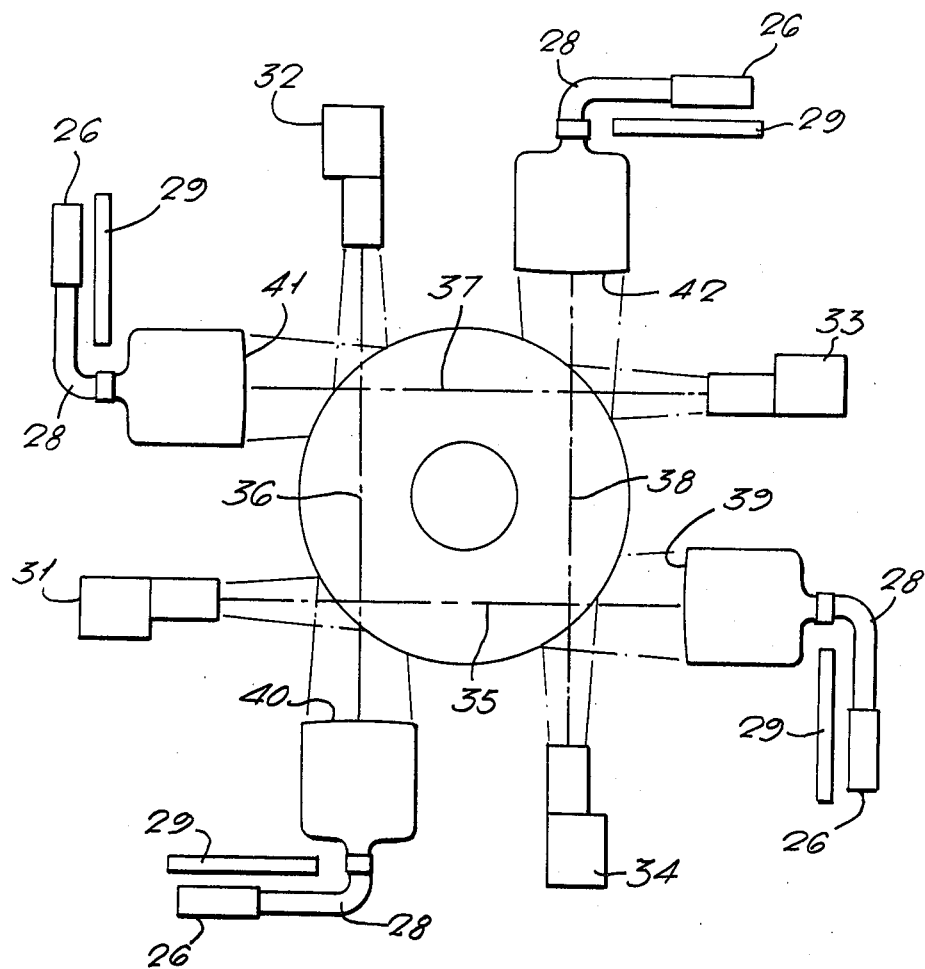
FIG. 3 is a similar view to FIG. 2 showing the alignment of a plurality of x-ray beams to cover the entire cross-section of the fan.

In FIG. 3 four x-ray tubes 31, 32, 33, 34 produce beams 35, 36, 37, 38 which traverse the entire cross-section of the fan before being received on respective screens 39, 40, 41, 42.

Figure 4:
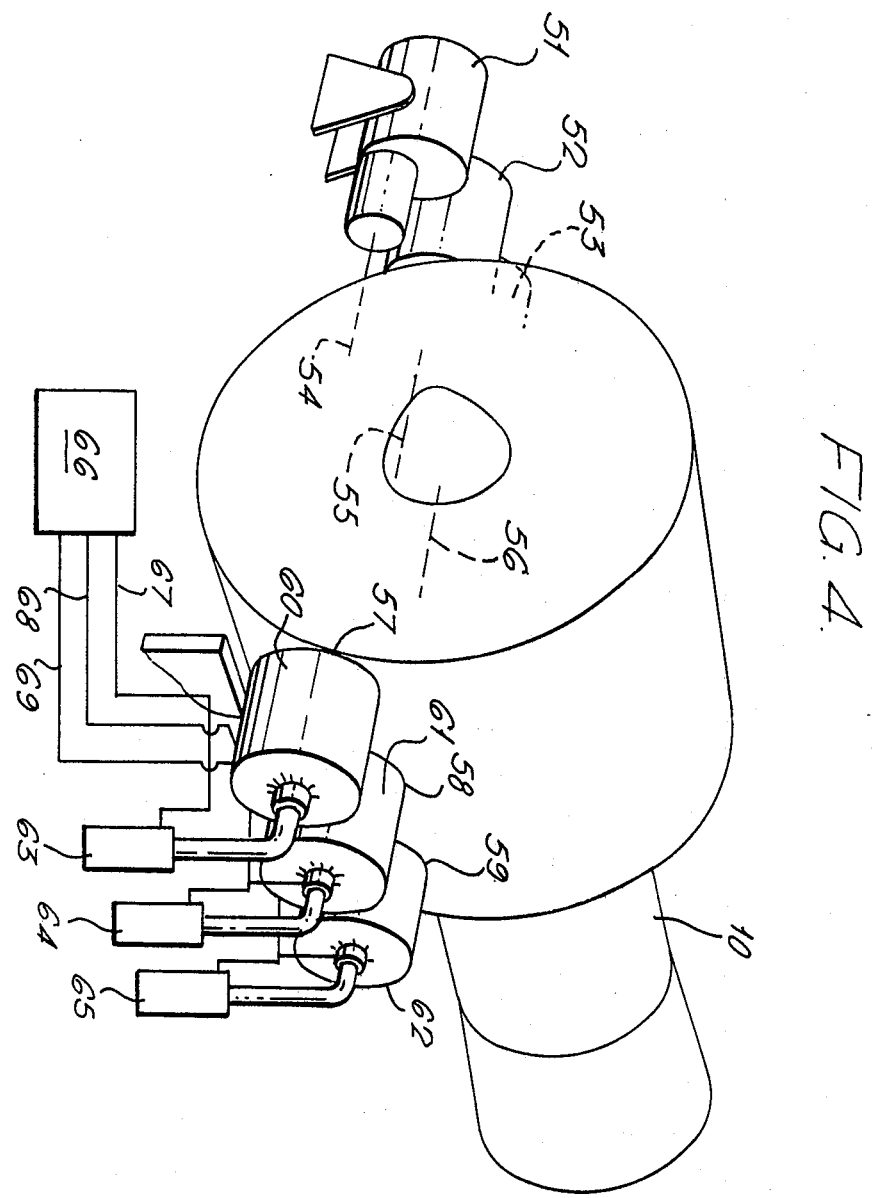
FIG. 4 is a schematic view of the engine of FIG. 1 showing the alignment of x-ray beams to cover the entire axial length of the fan casing.

In FIG. 4 three x-ray tubes 51, 52, 53, are arranged in a row to produce three respective beams 54, 55, 56, so that the entire axial length of the fan casing may be examined by the three screens 57, 58, 59 arranged to receive the respective beams 54, 55, 56. Each of the x-ray image intensifiers 60 61 62 and each of the high speed cameras 63, 64, 65 are interconnected to a gating apparatus 66 by cables 67, 68, and 69. This apparatus applies the same time base to and phases the three cinematographic cameras so that the chronology of observed events may be deduced. The time base or signature applied to the cine film can take the form of small indicating numerals in a corner of each frame of the film.

It will be understood that further x-ray tubes and fluorescent screens could be used for example by combining the arrangements of FIGS. 3 and 4 (thus making 12 tubes and 12 screens in all) to enable the entire volume of the fan casing to be observed.

It may prove possible to utilise relatively fewer x-ray producing devices than fluorescent screens by producing more than one output beam from each x-ray producing device.

Figure 5:
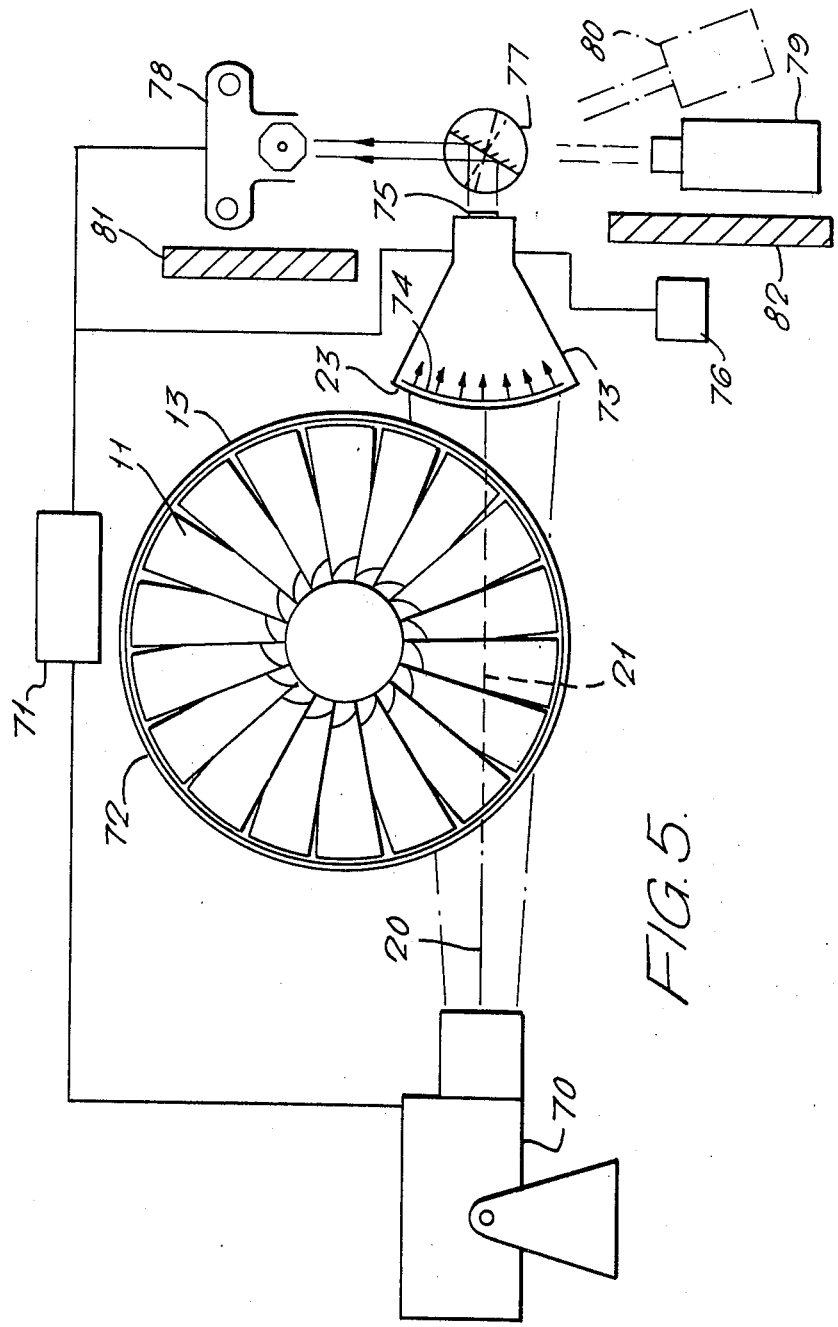
FIG. 5 is a schematic view of an alternative embodiment.

Turning now to FIG. 5 an alternative embodiment is shown in which a linear accelerator 70 is used as the x-ray source.

The accelerator has a high frequency output of x-rays at 5000 p.p.s. each pulse having a duration of about 3 micro seconds, and an output power in excess of 5000 Rads per minute at 1 meter.

The x-ray generator is thus a high pulse repetition frequency source and is pulsed from an electronic gating oscillator 71 in synchrony with the high speed camera 78 and the image intensifier 73.

The method of operation is as follows:

Pulses of x-radiation at 8 MeV are passed through the gas turbine engine 72 and are received on the fluorescent screen of a Thomson C.S.F. (Reg. Trade Mark) direct type intensifier. At this fluorescent screen, which is of Cesium Iodide, x-radiation is converted into light radiation which subsequently releases electrons from the backing layer 74 which are then intensified in the intensifier, before impinging on the output phosphor 75 of the output screen of the intensifier. The gain in luminance and hence contrast on the output screen may be controlled at this stage by varying the settings of the intensifier control 76.

The intensified (visible light) image on the output screen of the intensifier is optically relayed by a three position rotatable mirror 77 to one of a high speed cine camera 78 or to a video camera 79, or to a plate camera 80 whose function will be later explained. (Alternatively suitable optical means (half silvered mirror) can be employed to simultaneously record the output image on cine film and video tape).

The high speed cine camera is, in this instane, the proprietary Hadland "Hyspeed" which employs a rotating prism shutter and is controlled by the gating oscillator 71 to accept light from the intensifier only over a 20 microsecond period. The gating oscillator also controls the intensifier to be operative over only the same 20 microsecond period and also synchronises the 3 microsecond duration pulse from the linear accelerator. In this way clear pictures are achieved that avoid distortion from excessive rotation of the prism per frame, residual images on the intensifier phosshors do not confuse the picture and the pulse from the linear accelerator occurs at the right time i.e. at the beginning of each 20 microsecond period.

Lead shielding 81, 82 protects the camera and video camera from direct incidence of x-radiation from the linear accelerator.

The plate camera 80 is useful for deriving information about certain types of foreign object damage in which the timing of an event can be accurately prophesied. Such events include for example, the direct impact of a bullet or a projected stone on honeycombe structure. In such a situation knowledge of the velocity of the stone or bullet and its trajectory enable the time and place of impact on the honeycombe or other structure to be foretold and allows the x-ray source, the intensifier and the plate camera to be preset to operate at a specific time to record the event, or some particular stage of the event.

In this mode of use it is not necessary to restrict the range of foreign objects for which the technique is applicable to relatively radiographically dense metallic ones for recordings of the deformed metallic structure may alone provide useful information. As with the previous embodiment it is of course necessary to increase the number of x-ray sources to generate information about what is happening in complete crosssections of the engine, and FIG. 6 shows one way this may be done.

In FIG. 6 two linear accelerators 91, 92 are shown disposed one above each other together with collimating devices 93 which produce a beam of ellipsoidal configuration which can usefully traverse a complete cross-section of the engine. This sort of arrangement is particularly useful because the high capital cost of linear accelerators tends to make the use of several devices prohibitively expensive. In particular with the embodiment of FIG. 6 it is useful to use the gating oscillator 94 to operate one linear accelerator 91 out of phase with the other accelerator 92 so that noise generated by the operation of the one accelerator 91 does not degrade the quality of information received on the screen 95 of the intensifier associated with the other accelerator 92.

I claim:

1. A method of observing the passage of foreign objects through an operating gas turbine engine comprising the steps of:
    (a) energizing a means to produce beams of electromagnetic radiation in the energy range 150KV to 12 Mev each beam being of power greater than 50 rads per minute at a meter, said means having a substantially constant average output,
    (b) directing the beams along chordal lines of the gas turbine engine thereby to traverse substantially a whole crosssection of the engine,
    (c) receiving the exiting beams from the engine on respective fluorescent screens to form a fluorescent image thereon,
    (d) intensifying the fluorescent imges,
    (e) recording said intensified fluorescent images at speeds in excess of 2,500 frames per second by respective high speed recording means, and
    (f) applying a common time signature to each of the high speed recording means for the recording of time signatures along with the recording of each of the intensified fluorescent images to enable a determination of the sequence of events within the gas turbine engine.

2. A method of observing the passage of foreign objects through an operating gas turbine engine according to claim 1 wherein the substantially constant average output of said electromagnetic radiation means is achieved by energizing said means at a high pulse repetition frequency and including the further step of synchronising the pulses of electromagnetic radiation, the on period of the image intensifier, and the imaging period of each frame of the respective high speed recording means by way of a gating oscillator.

3. Diagnostic apparatus for observing the passage of foreign objects through an operating gas turbine engine comprising means for producing beams of electromagnetic radiation in the energy range 150 KV to 12 MeV, each beam being of power greater than 50 rads per minute at a meter and emitted at a substantially constant output, means for directing the beams along chordal lines of said gas turbine or traversing substantially a whole cross-section of the engine, respective fluorescent screens for receiving the exiting beams from the engine for forming a plurality of fluorescent images, means for intensifying each of said fluorescent images, respective high speed recording means for recording each of said intensified images at framing speeds in excess of 2,500 frames per second, and means for applying a common time signature to each of the high speed recording means to provide a recording of time signatures along with a recording of each of the intensified fluorescent images.

4. Diagnostic apparatus according to claim 3 wherein said means for producing beams of electromagnetic radiation comprises an x-ray tube operating at 350 KV and having a substantially constant output.

5. Diagnostic apparatus according to claim 3 wherein said means for producing beams of electromagnetic radiation comprises a plurality of 8 MeV linear accelerators having pulsed outputs of pulse repetition frequency greater than 400 pulses per second.

6. Diagnostic apparatus according to claim 5 further comprising a gating oscillator interconnecting said linear accelerators, said image intensifiers and said high speed recording means to sychronise the pulsing of said linear accelerators, the on period of said image intensifiers and the imaging period of each frame of said high speed recording means.

7. Diagnostic apparatus according to claim 3 wherein said high speed recording means comprises a high speed cine camera with a rotating prism shutter.

8. Diagnostic apparatus according to claim 7 wherein a gating oscillator is provided for restricting the imaging period of each frame to a period of 20 microseconds.

9. Diagnostic apparatus according to claim 8 wherein said gating oscillator also restricts the on period of the image intensifier to the same 20 microsecond period as the imaging period for each frame of the high speed cine camera.

10. Diagnostic apparatus according to claim 3 further comprising additional means for producing electromagnetic radiation, disposed to traverse successive cross sections of the engine and additional means for forming images of these successive cross sections whereby to allow simultaneous observation of a relatively greater axiall extention of the engine.

11. Diagnostic apparatus according to claim 3 wherein the means for producing beams of electromagnetic radiation comprises a pair of linear accelerators, means for disposing the linear accelerators one adjacent the other and means for collimating the individual beams therefrom into a single beam of generally elongate ellipsoidal section.

* * * * *